United States Patent [19]

Sutter, Jr.

[11] 4,455,658

[45] Jun. 19, 1984

[54] COUPLING CIRCUIT FOR USE WITH A TRANSVERSELY EXCITED GAS LASER

[76] Inventor: Leroy V. Sutter, Jr., 6301 Summertime La., Culver City, Calif. 90230

[21] Appl. No.: 370,103

[22] Filed: Apr. 20, 1982

[51] Int. Cl.³ ................................................ H01S 3/09
[52] U.S. Cl. ...................................... 372/38; 372/82; 372/87; 372/35
[58] Field of Search ........................ 372/82, 83, 61, 85, 372/64, 38, 35

[56] References Cited

U.S. PATENT DOCUMENTS 4,352,188  9/1982  Griffith .................................. 372/82
4,359,777  11/1982  Fox et al. .............................. 372/82

*Primary Examiner*—James W. Davie
*Attorney, Agent, or Firm*—W. Edward Johansen

[57] ABSTRACT

The present invention is an improved coupling circuit for use in combination wth a gas laser including a laser bore and electrode structure which includes an elongated chamber of cross-sectional dimensions suitable for confining a laser gas discharge with the elongated chamber being formed from a dielectric material and an opposing pair of parallel electrode plates, which are formed from an electrically conductive material, for transversely exciting a laser gas. An rf generator applies a voltage of alternating polarity between the pair of parallel electrode plates at a frequency ranging from 10 MHz to about 3 GHz to establish a laser gas discharge in the laser gas. A pair of optical reflectors for reflecting and guiding light energy from the laser gas discharge so that the light energy is optically independent of the internal walls of the elongated chamber as the light energy travels longitudinally the length thereof. The improved coupling circuit includes a first impedance-matching device for matching the steady state reactive impedance of the elongated chamber to the impedance of the rf generator and a second impedance-matching device coupling one of the pair electrode plate to the other electrode plate in order to cancel the pre-ignition reactive impedance of the elongated chamber. The first impedance-matching device couples the pair of electrode plates and the second impedance-matching device to the rf generator.

4 Claims, 17 Drawing Figures

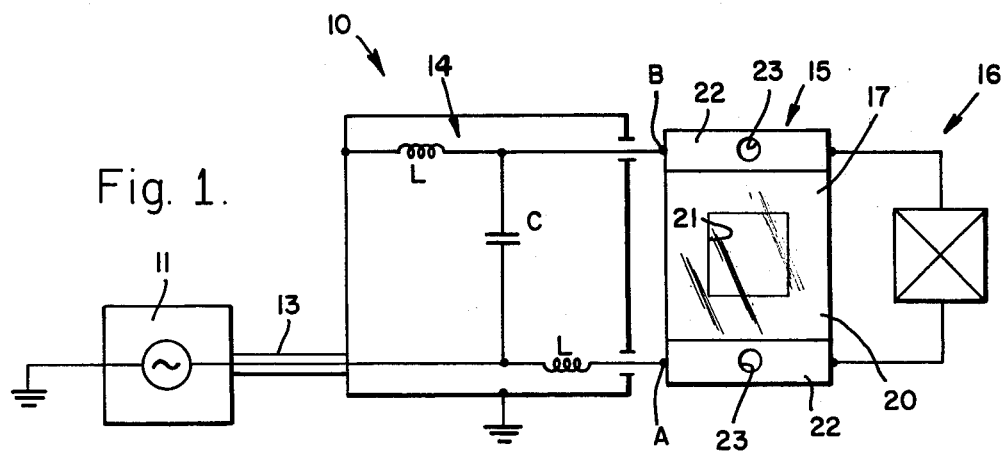
Fig. 1.
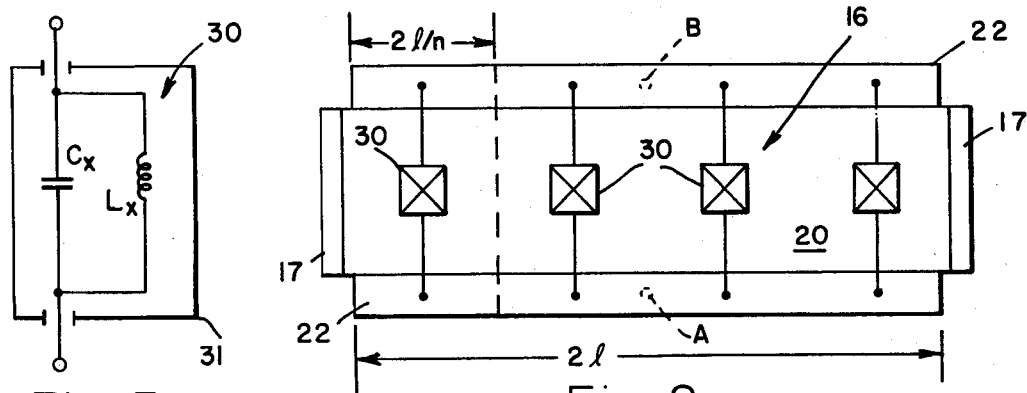
Fig. 3.   Fig. 2.
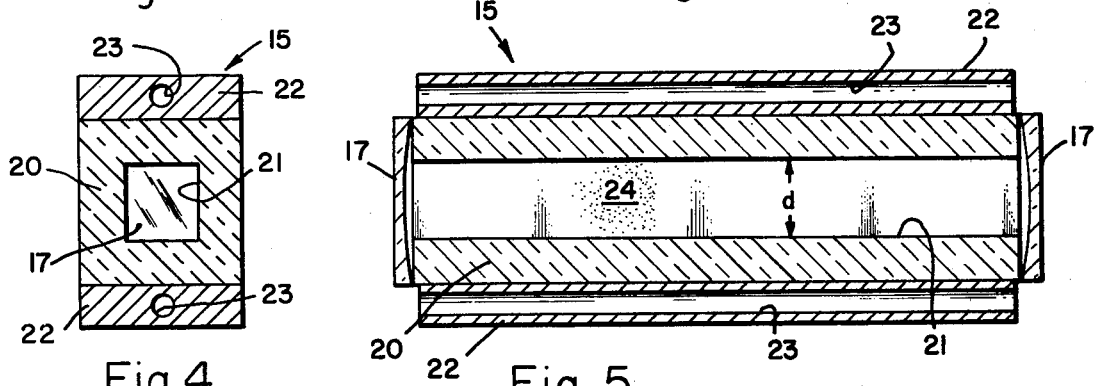
Fig. 4.   Fig. 5.
Fig. 6a.
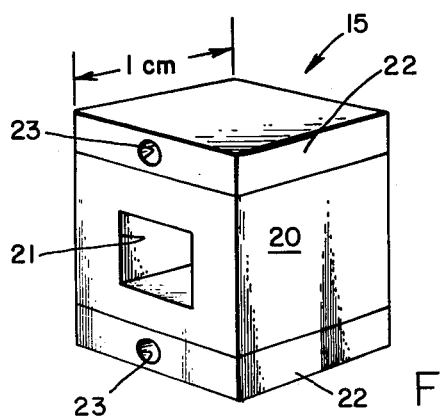
Fig. 6.
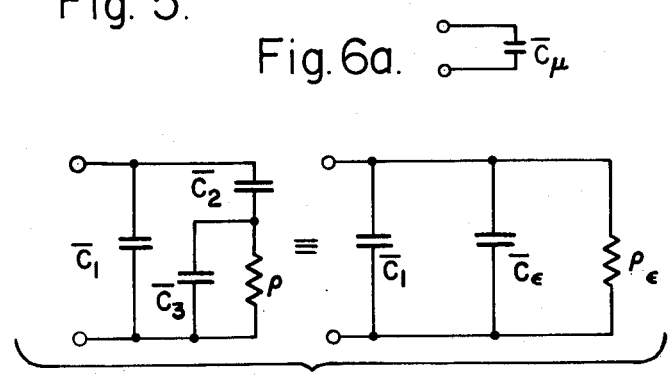
Fig. 6b.

COUPLING CIRCUIT FOR USE WITH A TRANSVERSELY EXCITED GAS LASER

BACKGROUND OF THE INVENTION

1. Field of the Invention

The present invention relates to transversely excited lasers with either external or internal capacitance coupling and more particularly to an improved matching network which operates efficiently in both the ignition state and steady state.

2. Description of the Prior Art

U.S. Pat. No. 4,352,188, entitled RF Pumped Waveguide Laser with Inductive Loading for Enhancing Discharge Uniformity, issued to Glen A. Griffith on Sept. 28, 1982, teaches a discharge-excited waveguide gas laser which utilizes a transverse rf excitation voltage at a frequency of at least about 30 MHz applied between elongated electrodes on opposite sides of the laser discharge chamber and which utilizes a plurality of shunt inductances coupled between the electrodes externally along the length of the chamber. These inductances provide a negative admittance which compensates for the variation in the phase angle of the transmission line reflection coefficient along the length of the laser discharge chamber. The variation in the magnitude of the standing wave voltage is reduced accordingly thereby improving the uniformity of the laser-exciting discharge.

U. S. Pat. No. 4,169,251, teaches Waveguide Gas Laser with High Freqency Transverse Discharge Excitation, issued to Katherine D. Laakman on Sept. 25, 1979, teaches waveguide lasers which are excited by means of a transverse discharge at rf frequencies generally in the vhf-uhf range, i.e., from about 30MHz to about 3 GHz. These excitation frequencies are sufficiently high to ensure negligible interaction of discharge electrons with the discharge-establishing electrodes, thereby achieving superior discharge properties which result in a laser of improved performance and reduced size and complexity.

Recently there has been considerable interest in waveguide gas lasers wherein the laser light propagates through a hollow waveguide which also serves to confine the laser-exciting discharge. U.S. Pat. No. 3,772,611, entitled Waveguide Gas Laser Devices, issued to Peter William Smith on Nov. 13, 1973, teaches the basic excitation scheme which was used in most of the early waveguide lasers and which involves establishing a dc electric discharge longitudinally through the device between a pair of electrodes disposed near the respective ends of the laser waveguide. This type of discharge required relatively large dc excitation voltages of around 10 Kv along with the necessary power supply and associated circuitry for generating voltages of this magnitude.

U.S. Pat. No. 3,772,611, also teaches the exciting of a ring-type waveguide laser from an rf source by means of a coil wound around the ring-shaped waveguide. Such a coil-type excitation arrangement not only is incapable of providing a highly uniform discharge, but it also affords poor coupling efficiency. Moreover, when more than a few coil turns are employed, the inductance of the coil becomes sufficiently large to limit the usable excitation frequencies below a few MHz.

In order to obtain a more uniform discharge with reduced excitation voltage, waveguide lasers have been developed wherein a pulsed discharge is established along a transverse waveguide dimension. U.S. Pat. No. 3,815,047, entitled Transversely-Excited Waveguide Gas Laser, issued to Peter William Smith and Obert Reeves Wood on June 4, 1974, teaches transversely-excited waveguide gas lasers which include a structure having a smooth base copper-anode and a plurality of cathode squares plated on a dielectric forming the wall opposite the copper-anode and a laser excitation source which is electrically coupled to the anode and cathode of the structure. The transversely-excited waveguide gas lasers also include an enclosure which encloses the structure and a plurality of gas inlets and outlets which maintain the laser gases at high total gas pressure within the structure. The transversely-excited waveguide gas lasers which have been operated in the quasi-continuous mode at pulse repetition rates as high as 40 kHz, as described in Smith et al., High Repetition-Rate and Quasi-CW Operation of a Waveguide Laser $CO_2$ TE Laser, *Optics Communication,* Volume 16, Number 1, January 1976, pages 50–53.

U.S. Pat. No. 4,103,255, entitled High Power, Compact Waveguide Gas Laser, issued Howard R. Schlossberg on July 25, 1978, teaches a high power, compact waveguide gas laser housing located within a resonant cavity. The housing has a longitudinal chamber situated therein. The chamber is divided into a plurality of waveguides by a plurality of infrared transmitting partitions. During operation of the laser, the leakage of laser radiation between adjacent waveguides through the partitions causes coupling of the phases of the waveguide modes thereby producing a laser output of high power.

SUMMARY OF THE INVENTION

In view of the foregoing factors and conditions which are characteristic of the prior art it is the primary object of the present invention to provide an improved coupling circuit for use in a transversely excited gas laser which not only has a uniform laser gas discharge at a high electrical efficiency, but also is easy to ignite.

It is another object of the present invention to provide a pair of optical reflectors in a transversely excited gas laser which reflect and guide the laser light energy through an elongated chamber of a laser bore and electrode structure so that the laser light energy is optically independent of the elongated chamber which does not function as a waveguide thereby eliminating both distortions to the optical mode and contamination to the laser gas due to the elongated chamber of the transversely excited gas laser.

It is still another object of the present invention to provide an improved coupling circuit for use in a transversely excited gas laser which simultaneously incorporates simplicity of design, high electrical efficiency, ease of ignition and uniform discharge into a transversely excited gas laser which is economical to manufacture.

In accordance with the present invention an embodiment of an improved coupling circuit for use in combination with a gas laser is described. The gas laser includes a laser bore and electrode structure having an elongated chamber of cross-sectional dimensions suitable for confining a laser gas discharge with the elongated chamber being formed from a dielectric material and an opposing pair of parallel electrode plates, which are formed from an electrically conductive material, for transverely exciting the laser gas. An rf generator applies a voltage of alternating polarity between the pair of parallel electrode plates at a frequency ranging from 10 Mhz to about 3 GHz to establish a laser gas discharge in the laser gas. A pair of optical reflectors for reflecting and guiding light energy from the laser gas discharge so that the light energy is optically independent of the internal walls of the elongated chamber as the light energy travels longitudinally the length thereof. The improved coupling circuit includes a first impedance-matching device for matching the steady state reactive impedance of the elongated chamber to the impedance of the rf generator and a second impedance-matching device coupling one of the pair electrode plate to the other electrode plate in order to cancel the pre-ignition reactive impedance of the elongated chamber. The first impedance-matching device couples the pair of electrode plates and the second impedance-matching device to the rf generator.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a schematic drawing of a transversely excited gas laser including a laser bore and electrode structure in combination with an improved coupling circuit including first and second impedance-matching circuits which have been constructed in accordance with the principles of the preferred embodiment of the present invention.

FIG. 2 is a side elevational view of the plurality of casings each of which encloses one of a plurality of LC circuits which together form the second impedance-matching circuit of FIG. 1.

FIG. 3 is a schematic drawing of the LC circuit in each of the casings of FIG. 2.

FIG. 4 is a transverse cross-sectional view of an elongated chamber and an opposing pair of parallel electrode plates of the laser bore and electrode structure of FIG. 1.

FIG. 5 is a longitudinal cross-sectional view of the elongated chamber and an opposing pair of parallel electrode plates of FIG. 4.

FIG. 6 is a perspective drawing of an incremental portion having a length of a one centimeter of the laser bore and electrode structure of FIG. 1.

FIG. 6a is a schematic drawing of the equivalent circuit of the incremental portion of the laser bore and electrode structure of FIG. 6 in the pre-ignition state when the transversely excited gas laser is unlit.

FIG. 6b is a schematic drawing of the equivalent circuit of the incremental portion of the laser bore and electrode structure of FIG. 6 in the steady state when the transversely excited gas laser is lit.

DESCRIPTION OF THE PREFERRED EMBODIMENT

Figure 7:
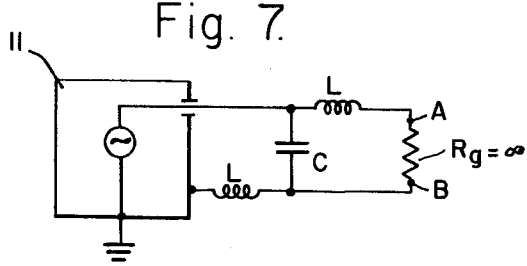
FIG. 7 is a schematic drawing of the equivalent circuit in the pre-ignition state, of the transversely excited gas laser of FIG. 1.

In order to best understand the present invention it is necessary to refer to the following description of its preferred embodiment in conjunction with the accompanying drawing. Referring to FIG. 1 a transversely excited gas laser 10 includes an rf generator 11, an improved coupling circuit and a coaxial connector 13 which electrically couples the rf generator 11 to the improved coupling circuit. The improved coupling circuit includes a first impedance-matching circuit 14, which is electrically coupled to a laser bore and electrode structure 15, and a second impedance-matching circuit 16, which is electrically coupled across the laser bore and electrode structure 15. The transversely excited gas laser 10 further includes a pair of optical reflectors 17, which form a laser resonator.

Referring to FIG. 2 in conjunction with FIG. 1 the laser bore and electrode 15 includes an elongated chamber 20 of cross-sectional dimensions, not only in the range of 0.25 mm$^2$ to 7.5 mm$^2$, but also in the range greater than 7.5 mm$^2$, which is suitable for confining a laser gas discharge. The elongated chamber 20 includes walls 21 which are formed from a dielectric material, such as BeO, Al$_2$O$_3$ or glass. The laser bore and electrode structure 15 also includes first and second parallel electrodes plates 22 each of which has a cooling bore 23 through which a coolant can flow. The first and second parallel electrode plates 22 are formed from an electrically conductive material, such as aluminum or copper, and are disposed opposing each other. The first and second electrode plates 22 are used for transverely exciting a laser gas 24, which may be a standard $CO_2$ laser gas mixture including 65% He, 22% $N_2$, 13% $CO_2$ by mole fraction. The rf generator 11 provides an alternating electric field in the elongated chamber 20 along a direction transverse to the length of the elongated chamber 20 and at a frequency ranging from 10 MHz to about 3 GHz to establish the laser gas discharge in the laser gas 24.

A sufficient amount of the laser gas 24 must be maintained in the elongated chamber 20 in order to support the laser gas discharge. The laser gas 24 is at pressure ranging from 1 Torr to about 1000 Torr. The laser gas 24 is sealed in the elongated chamber 20. In the preferred embodiment the pair of optical reflectors 17 are optically aligned with and mechanically coupled to the elongated chamber 20 in to seal the laser gas 24 in the elongated chamber 20.

The optical reflectors 17 reflect light energy from the laser gas discharge within the elongated chamber 20 so that the light energy travels longitudinally the length of the elongated chamber 20. In the preferred embodiment the optical reflectors 17 not only reflect, but also guide the light energy within the elongated chamber 20 so that the light energy is optically independent of the internal walls 21 of the elongated chamber 20.

In another embodiment the transversely excited gas laser 10 may also include a gas inlet and a gas outlet for letting the laser gas 24 into and out of the elongated chamber 20 and a gas regulating device for regulating the pressure of the laser gas 24 in the elongated chamber 20.

In still other embodiments the transversely excited gas laser 10 may include an enclosure in which the elongated chamber 20 is disposed and the laser gas 24 is sealed. The transversely excited gas laser 10 may also include a gas inlet and a gas outlet for letting the laser gas 24 into and out of the enclosure and a gas regulating device for regulating the pressure of the laser gas 24 in the enclosure.

Referring to FIG. 2 in conjunction with FIG. 3 the second impedance-matching circuit 16 includes a plurality of LC circuits 30 each of which is enclosed in a casing 31 and which together form the second impedance-matching circuit 16.

Referring to FIG. 4 and FIG. 5 in conjunction with FIG. 1 and FIG. 2 in the preferred embodiment of the laser bore and electrode structure 15 the elongated chamber 20 has a square cross-section. The elongated chamber 20 has first and second opposing walls 21, separated a distance d apart, and third and fourth opposing walls 21, all of which are formed from a dielectric material. In another embodiment the first and second opposing walls 21' of of the elongated chamber may be formed of electrically conductive material, separated by a distance d apart, wherein the first and second opposing walls 21' of the elongated chamber 20' function as the electrodes plates 22'.

Referring to FIG. 6 in conjunction with FIG. 6a the equivalent circuit of an incremental portion having a length of one centimeter of the laser bore and electrode structure 15 in the pre-ignition state, when the transversely excited gas laser 10 is unlit, includes a capacitor of a distributed equivalent capacitance (pf/cm), $\overline{C}_\mu$, which is defined by the equation, $\overline{C}_\mu = \overline{C}_1 + [\overline{C}_2 \times \overline{C}_3)/(\overline{C}_2 + \overline{C}_3)]$. The equations, $\overline{C}_1 = C_1/21$ and $\overline{C}_2 = C_2/21$, define the distributed capacitances, where $C_1$ = the capacitance of the third and fourth opposing walls 21 and $C_2$ = capacitance of the first and second walls 21 and where 21 = the length of the elongated chamber 20. The equation, $\overline{C}_3 = C_3/21$ defines the distributed capacitance where $C_3$ = the capacitance across the laser bore.

Referring to FIG. 6 in conjunction with FIG. 6b the equivalent circuit of an incremental portion having a length of a one centimeter of the laser bore and electrode structure 15 in the steady state, when the transversely excited gas laser 10 is lit, includes the first distributed capacitance, $\overline{C}_1$, electrically coupled in parallel to second distributed capacitance, $\overline{C}_2$, electrically coupled in series with the third distributed capacitance, $\overline{C}_3$, electrically coupled in parallel with a first resistor of resistivity, $\rho$ ($\Omega$cm), which is the gas discharge resistivity of the laser gas 24. By using Thevenin's theorem an equivalent capacitor of distributed capacitance, $\overline{C}_\epsilon$, and an equivalent resistor of resistivity, $\rho_\epsilon$, in parallel may replace the second and third capacitors of distributed capacitance, $\overline{C}_2$ and $\overline{C}_3$ and the first resistor of resistivity, $\rho$, in the equivalent circuit of FIG. 6b.

The laser bore and electrode structure 15 forms a lossy transmission line with the characteristic impedance, Z. The equation, $Z = \sqrt{\overline{L}/\overline{C}}$, where $\overline{C}$ = capacitance unit length (pf/cm) and $\overline{L}$ = inductance per unit length (H/cm). The capacitance, $\overline{C}$, will vary for the two states, preignition and steady, when the transversely excited gas laser 10 is unlit and lit, respectively.

In order to achieve the best matching it is desirable to have a first condition in which the equivalent distributed capacitance, $\overline{C}_\mu$, of the pre-ignition state be approximately equal to the equivalent distributed capacitance of the steady state. The equation, $\overline{C}_\mu/(\overline{C}_1 + \overline{C}_\epsilon) \approx 1$, defines the first condition.

In order to obtain low attenuation it is desirable to have a second condition in which the RC time constant times the radial frequency of the equivalent circuit of FIG. 6b is equal to or greater than 5. The equation, $\omega(\overline{C}_\epsilon + \overline{C}_1)\rho_\epsilon \gtrsim 5$, defines the second condition. It may be necessary to add extra capacitance periodically to the laser bore and electrode structure 15 in order to meet the first and second conditions. The laser bore and electrode structure 15 is divided into a number, n, electrically equivalent sections with the equation, $n \approx 6\omega l \sqrt{[\overline{L}(\overline{C}_1 + \overline{C}_\epsilon)]}$, defines the number of sections. The reactive network of a reactance, X, includes the plurality of LC circuits 30. Each LC circuit 30 includes a capacitor of a capacitance, $C_x$, and an inductor of inductance, $L_x$. One of the LC circuits 30 electrically couples the first electrode plate 22 to the second electrode plate 22 in each section of the laser bore and electrode structure 15. The conditions for capacitance, $C_x$, of the capacitor of the LC circuit 30 is defined by the equation, $(nc_x/21 + \overline{C}_\mu)/(nc_x/21 + \overline{C}_1 + \overline{C}_\epsilon) \approx 1$. The equation, $L_x \approx 1/\omega^2[C_x + 21/n(\overline{C}_1 + \overline{C}_\epsilon)]$, defines the inductance $L_x$, of the inductor of the LC circuit 30. If the values of $L_x$ and $C_x$ are consistent with the conditions and equations above, when the first impedance-matching circuit 14 is electrically coupled to the feed points A and B of the laser bore and electrode structure 15 the first impedance-matching circuit will see a resistance across the feed points A and B. The equation, $R_q \approx \rho_\epsilon/21$, defines the resistance of the laser gas 24 across the feed points A and B. $R_g$ is equal to infinity, $R_g=\infty$, in the pre-ignition state. $R_g$ is greater than 0, but less than infinity, $0 \lesssim R_g \lesssim \infty$, in the steady state.

Alternatively, $\overline{C}_1$ can be made to meet the first and second conditions without adding $C_x$ by increasing the thickness of the third and fourth opposing walls 21" of the elongated chamber 20" and minimizing the thickness of the first and second opposing walls 21" thereof.

Figure 7A:
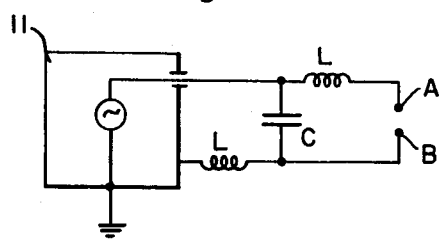
FIG. 7a is another schematic drawing of the equivalent circuit of FIG. 7 where an open circuit replaces the infinite resistance of the laser gas between the pair of electrode plates of FIG. 4.

Referring to FIG. 7 in conjunction with FIG. 7a the equivalent circuit of the transversely excited gas laser 10 in the pre-ignition state. The rf generator 11 has a characteristic impedance, $Z_0$. The first matching circuit 14 has a first capacitor of capacitance, C, electrically coupling the first output of the rf generator 11 to the feed point B and a first inductor of inductance, L, electrically coupling the second output of the rf generator 11 to the feed point B. The first matching circuit 14 also has a second inductor of inductance, L, electrically coupling the first output of the rf generator 11 to the feed point A. The equivalent circuit of the laser bore and electrode structure 15 and the second impedance-matching circuit 16 is a resistor of resistance, $R_g$, across the feed points A and B. An open circuit may replace a resistor of infinite resistance. This equivalent circuit must be in resonance in order to achieve easy ignition. The equation, $\omega^2 LC=1$, defines the condition for resonance of the equivalent circuit of transversely excited gas laser 10 in the pre-ignition state when the transversely excited gas laser 10 is unlit.

Figure 8:
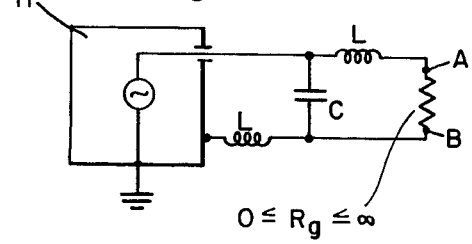
FIG. 8 is a schematic drawing of the equivalent circuit, in the steady state, of the transversely excited gas laser of FIG. 1 operating in the bipolar mode.

Referring to FIG. 8 in the equivalent circuit of the transversely excited gas laser 10 in the steady state the inductance, L, and the capacitance, C, must also match when the transversely excited gas laser <u>10 is</u> lit. The equations, $L=\sqrt{R_g Z_0}/\omega$ and $C=1/\omega\sqrt{R_g Z_0}$, define the inductance of the inductor and capacitance of the capacitor of the first impedance-matching circuit 14. The voltage at the feed points A and B is defined by the equation, $V_A = -V_B$, which defines a bipolar circuit. The transversely excited gas laser 10 is operating in the bipolar mode.

Figure 8A:
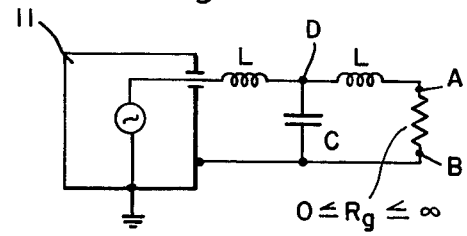
FIG. 8a is a schematic drawing of the equivalent circuit, in the steady state, of the transversely excited gas laser of FIG. 1 operating in the unipolar mode.

Referring to FIG. 8a in conjunction with FIG. 8 in another embodiment a first matching circuit 14' has a first inductor of inductance, L, electrically coupling the first output of the rf generator 11 to a bridge point D and a first capacitor of capacitance, C, electrically coupling the second output of the rf generator 11, which is electrically coupled to the feed point B and to ground, to the bridge point D. The first matching circuit 14' also has a second inductor of inductance, L, electrically coupling the bridge point D to the feed point A. The equivalent circuit of the laser bore and electrode structure 15 and the second impedance-matching circuit 16 is a resistor of resistance, $R_g$, across the feed points A and B. When the transversely excited gas laser 10 is operating in the unipolar mode, the voltage in the steady state at the feed points A and B is defined by the conditions, $|V_A| \geq 0$, $V_B = 0$, which defines a unipolar circuit.

Figure 9:
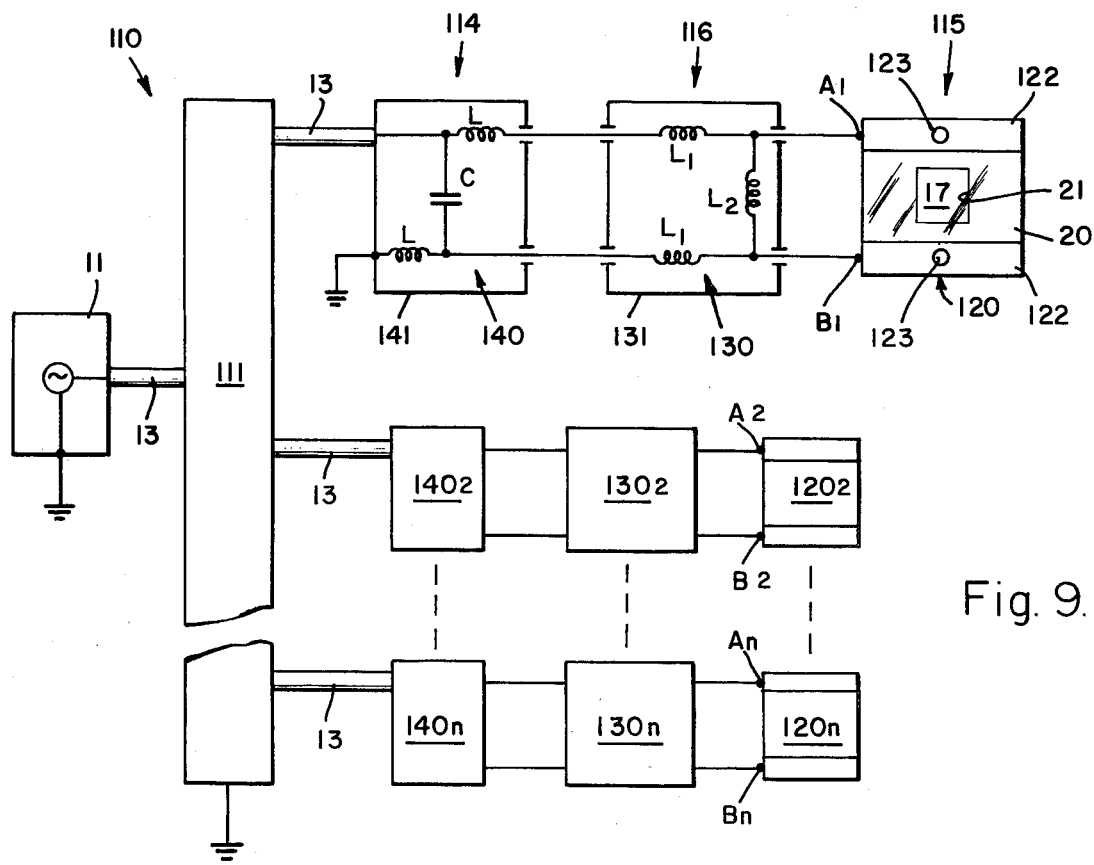
FIG. 9 is a schematic drawing of a transversely excited gas laser operating in the bipolar mode and having a laser bore and electrode structure which includes an elongated chamber and a plurality of opposing pairs of parallel electrode plates, in combination with an improved coupling circuit, which includes first and second impedance-matching circuits which have been constructed in accordance with the principles of the second embodiment of the present invention.
Figure 9A:
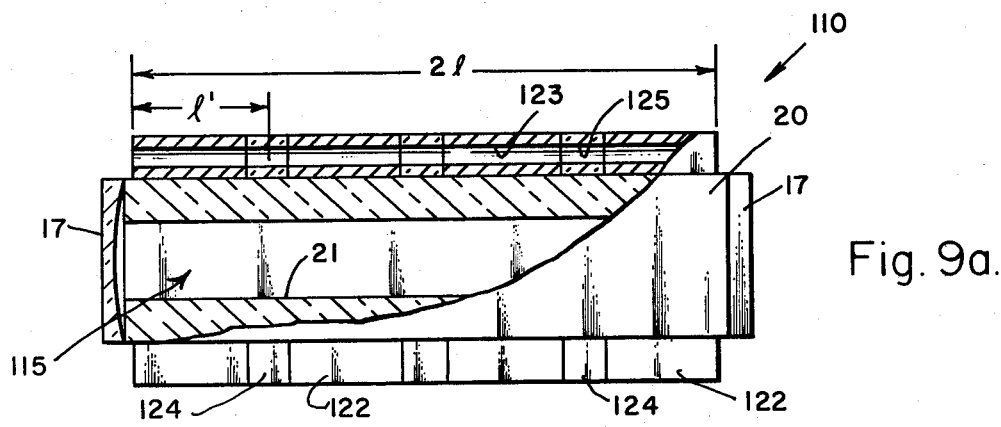
FIG. 9a is a side elevational view with a partial cross-sectional view of the laser bore and electrode structure showing the plurality of opposing pairs of parallel electrode plates each pair of which being electrically coupled together by one of a plurality of inductance circuits of the second impedance-matching circuit of FIG. 9.

Referring to FIG. 9 in conjunction with FIG. 9a a transversely excited gas laser 110 includes an rf generator 11 and a power splitter 111, the input of which a coaxial connector 13 electrically couples to the rf generator 11 and which has a plurality of outputs. The transversely excited gas laser 110 also includes an improved coupling circuit including a first impedance-matching circuit 114 and a laser bore and electrode structure 115. The improved coupling circuit also has a second impedance-matching circuit 116 electrically coupling the first impedance-matching circuit 114 to the laser bore and electrode structure 115.

The laser bore and electrode structure 115 includes an elongated chamber 20 and a plurality of electrode sections 120 wherein each electrode section 120 includes a pair of opposing parallel electrode plates 122 each of which has a cooling bore 123. The equations, $1' \lesssim 1/3\omega Z_0 \overline{C}_1$ and $1' = 2l/n$, define the length of each electrode section 120. The laser bore and electrode 115 also includes a plurality of dielectric spacers 124 each of which has a cooling bore 125 which is axially aligned with the cooling bores 123 of the electrode plates 122. The electrodes plates 122 and the dielectric spacers 124 are alternately disposed adjacent to each other and along each of the outer surface of the first and second walls 21 of the elongated chamber 20. The transversely 115 includes a pair of optical reflectors 17, such as concave mirrors, which are optically aligned with the elongated chamber 20 and which attached to the ends of the elongated chamber 20 in order to hermetically seal a laser gas 24 within the elongated chamber 20.

The second impedance-matching circuit 116 includes a plurality of inductance circuits 130 each of which is electrically coupled to one of the electrode sections 120. Each of the plurality of inductance circuits 130 is enclosed in a casing 131.

The first impedance-matching circuit 114 includes a plurality of LC circuits 140 each of which is electrically coupled to one of the inductance circuits 130. Each of the plurality of LC circuits 140 is enclosed in a casing 141. The transversely excited gas laser 110 is operating in the bipolar mode.

Each output of the power splitter 111 is electrically coupled to one of the LC circuits 140 of the improved coupling circuit.

In the inductance circuit 130 the equations, $L_1 \approx \frac{1}{2}\omega^2 \overline{C}_v 1'$ and $L_2 \approx 1/\omega^2 \overline{C}_{82} 1'$, define the values of the inductors and the equation, $\omega(\overline{C}_\epsilon + \overline{C}_1)\rho_\epsilon \gtrsim 5$, meets the second condition. The equation, $\overline{C}_v = \overline{C}_\eta [(1-\kappa)/\kappa]$, defines $\overline{C}_v$, where $\kappa=(\omega \overline{C}_\eta \rho_\epsilon)^2$ and $\overline{C}_\eta = \overline{C}_\epsilon - [(\overline{C}_2 \times \overline{C}_3)/(\overline{C}_2 + \overline{C}_3)]$, and with $\overline{C}_1$, $\overline{C}_2$, $\overline{C}_3$, $\overline{C}_\mu$ and $\overline{C}_\epsilon$ being defined in the same manner as in the transversely excited gas laser 10 in FIG. 6a and FIG. 6b.

Figure 10:
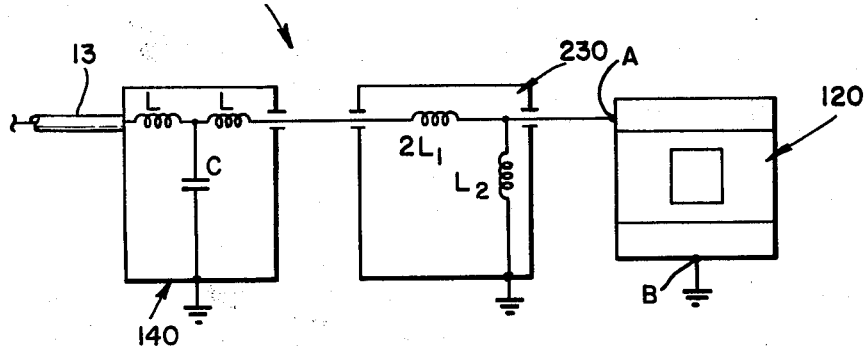
FIG. 10 is a partial schematic drawing of the transversely excited gas laser of FIG. 9 operating in the unipolar mode as a result of using a different first impedance-matching circuit.

Referring to FIG. 10 a transversely excited gas laser 210 operating in the unipolar mode when a different inductance circuit 230 of a second impedance-matching circuit 216 replaces the second the inductance circuit 130 of the impedance-matching circuit 115 of FIG. 9.

Figure 11:
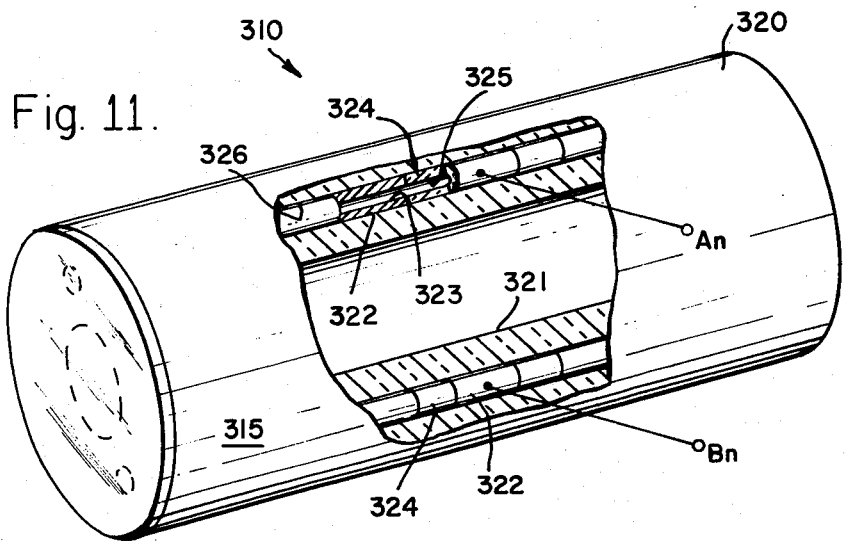
FIG. 11 is a perspective drawing of an elliptical laser bore and electrode structure with a transverse cross-sectional view of a section showing a plurality of opposing pairs of alternating parallel electrode rods and ceramic spacers disposed within a pair of longitudinal bores in the elliptical laser bore and electrode structure which has been constructed in accordance with the principles of the third embodiment of the present invention.

Referring to FIG. 11 a transversely excited gas laser 310 has an elliptical laser bore and electrode structure 315 which includes an elongated ellipical chamber 320 with a circular bore 321 having a diameter of d and a plurality of pairs of opposing parallel electrode rods 322 each of which has cooling bores 323 and dielectric spacers 324 each of which has a cooling bore 325. The electrode rods 322 and the dielectric spacers are axially aligned and alternately disposed within one of an opposing pair of parallel bores 326 in the elliptical elongated chamber 320. The transversely excited gas laser 310 also includes the same improved coupling circuit 114 as does the transversely excited gas laser 110.

Figure 12:
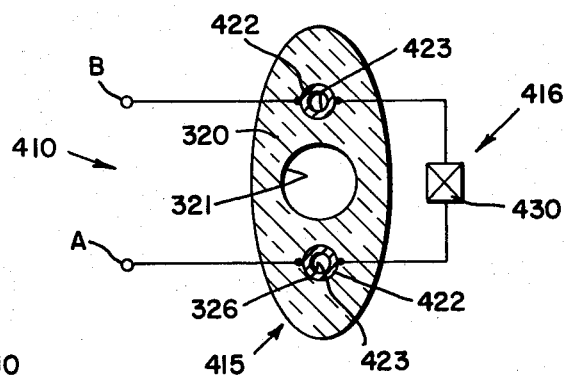
FIG. 12 is a transverse cross-sectional view of an elliptical laser bore and electrode structure which includes an opposing pair of parallel electrode rods in combination with a first impedance-matching circuit of an improved coupling circuit which has been constructed in accordance with the principles of the fourth embodiment of the present invention.

Referring to FIG. 12 a transversely excited gas laser 410 includes an improved coupling circuit with a first impedance-matching circuit 14 and a laser bore and electrode structure 415 which is electrically coupled to a second impedance-matching circuit 416 and which includes an elongated elliptical chamber 320 having a pair of opposing bores 326 in which a pair electrode rods 422 each of which has a cooling bore 423. The second impedance-matching circuit 416 includes a plurality of LC circuits 430 each of which is disposed in a casing 431.

From the foregoing it can be seen that improved coupling circuits and unique designs of laser bore and electrode structures for transversely excited gas lasers have been described. The advantage of improved coupling circuit is that it provides not only electrical efficiency in the steady state operation of the transversely excited gas laser, but also ease of ignition in the pre-ignition state. The use of external electrodes allows the electrodes to be more easily maintained and cleaned than does the use of internal electrodes thereby increasing the service life of the transversely excited gas laser. The unique designs for the laser bore and electrode structure in conjunction with the improved coupling circuit permits the use of a larger chamber bore in which the laser gas discharge takes place and allows the optical reflectors to not only reflect the light energy of the laser gas discharge, but also to guide the light energy so that it is optically independent of the larger chamber bore as it travels longitudinally therethrough. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A gas laser having an improved coupling circuit for use in combination with said gas laser which includes:
   a. an elongated chamber of cross-sectional dimensions suitable for confining a laser gas discharge, at least a portion of said elongated chamber being formed from a dielectric material;
   b. a laser gas disposed in said elongated chamber;
   c. first and second reflecting means for reflecting light energy from said laser gas discharge within said elongated chamber so that said light energy travels longitudinally the length of said elongated chamber;
   d. first and second electrode means for transversely exciting said laser gas, each of said electrode means being formed from an electrically conductive material and being disposed opposing each other; and
   e. energy means for applying a voltage of alternating polarity between said first and second electrode means at a frequency ranging from 10 Mhz to about 3 GHz to establish a laser gas discharge in said laser gas with said improved coupling circuit coupling said first and second electrodes means to said energy means, said improved coupling circuit comprising:
      (i) first impedance-matching means for matching the steady state reactive impedance of said elongated chamber to the impedance of said energy means; and
      (ii) second impedance-matching means coupling said first electrode means to said second electrode means in order to cancel the pre-ignition reactive impedance of said elongated chamber, said first impedance-matching means coupling said first and second electrode means and said second impedance-matching means to said energy means.

2. A gas laser according to claim 1 wherein said elongated chamber has a rectangular cross-section, said elongated chamber has first and second opposing walls of dielectric material and also has third and fourth opposing walls of dielectric material.

3. A gas laser according to claim 1 wherein each of said first and second reflecting means are first and second mirrors, each of said mirrors being disposed at one of the ends of said elongated chamber.

4. A gas laser according to claim 1 wherein said laser gas is at a pressure ranging from 1 Torr to about 1000 Torr.

* * * * *